(12) United States Patent
Komatsu et al.

(10) Patent No.: US 6,207,223 B1
(45) Date of Patent: Mar. 27, 2001

(54) METHOD FOR PRODUCING MAGNETIC RECORDING MEDIUM

(75) Inventors: Kazunori Komatsu; Seiji Kasahara, both of Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/357,988

(22) Filed: Jul. 21, 1999

(30) Foreign Application Priority Data

Jul. 22, 1998 (JP) .................................................. 10-206755

(51) Int. Cl.[7] ................................ B05D 1/36; B05D 3/12; B05D 5/12
(52) U.S. Cl. ...................... 427/131; 427/132; 427/412.1; 427/412.5; 427/365
(58) Field of Search ..................................... 427/127, 128, 427/129, 130, 131, 132, 407.1, 412.1, 412.5, 365

(56) References Cited

U.S. PATENT DOCUMENTS

| 4,927,665 | * | 5/1990 | Chino et al. | 427/131 |
| 5,069,934 | * | 12/1991 | Chino et al. | 427/131 |
| 5,474,814 | * | 12/1995 | Komatsu et al. | 427/130 |

FOREIGN PATENT DOCUMENTS

| 5-104054 | | 4/1993 | (JP) . |
| 5-212337 | | 8/1993 | (JP) . |
| 7-129947 | * | 5/1995 | (JP) . |
| 7-287843 | | 10/1995 | (JP) . |
| 9-212861 | * | 8/1997 | (JP) . |

* cited by examiner

Primary Examiner—Erma Cameron
(74) Attorney, Agent, or Firm—Sughrue, Mion, Zinn, Macpeak & Seas, PLLC

(57) ABSTRACT

In a method for producing a multilayer magnetic recording medium having at least three coating layers on a side of a magnetic recording layer side, the at least three coating layers are formed on the magnetic layer side at least two times dividedly.

4 Claims, 1 Drawing Sheet

METHOD FOR PRODUCING MAGNETIC RECORDING MEDIUM

BACKGROUND OF THE INVENTION

1. Field of the Invention

The present invention relates to a method for producing a magnetic recording medium, in particular, a producing method of a magnetic recording medium which is excellent in surface properties and capable of achieving high output.

2. Description of the Related Art

With the trend of the increase of density of magnetic recording media in recent years, recording wavelength has become narrow. As a result, the thickness of a magnetic layer has become thinner. On the other hand, separately from main recording, tracking signal recording such as servo signals has become necessary. Therefore, a multilayer magnetic recording medium having a plurality of magnetic recording layers has been proposed. As producing methods and producing apparatuses therefor, e.g., JP-A-5-212337 (the term "JP-A" as used herein means an "Unexamined Japanese patent Publication (kokai)") suggests simultaneous multilayer coating methods and apparatuses.

The techniques disclosed in JP-A-5-212337 has elaborated to discharge a coating solution from a plurality of slits for effectively preventing generation of uneven colors and vertical streaks in multilayer coating of thin layers, and preventing the reduction of orientation properties to manufacture good magnetic recording media stably. Further, at least a coating solution for the lowermost layer is made nonmagnetic solution and a coating unit the edge shape of which is contrived is used for coating.

However, in such a multilayer simultaneous coating method, it is very difficult to select optimal viscosity of a coating solution of each layer to obtain a desired coating thickness of each layer while preventing the turbulence in the interface between each layer, at the same time, ensuring the surface properties of the uppermost layer. Further, a coating unit becomes complicated because at least three feeding pipe and slits are required. In addition, when a magnetic recording medium comprises a plurality of magnetic layers, control and insurance of the thickness of each layer during production are difficult.

SUMMARY OF THE INVENTION

It is an object of the present invention to provide a method for producing a magnetic recording medium capable of preventing the turbulence in the interface between each layer and ensuring the surface properties of the uppermost layer.

The above object of the present invention can be achieved by the following constitution.

(1) A method for producing a multilayer magnetic recording medium having at least three layers on the side of a support on which a magnetic recording layer is provided, comprises forming all the coating layers on the magnetic layer side using a monolayer coating step and a simultaneous multilayer coating step.

(2) In the method for producing a magnetic recording medium as described in the above item (1), said two times of layer formation include at least one time of simultaneous multilayer coating of two layers.

(3) The method for producing a magnetic recording medium as described in the above item (1) or (2), further comprises performing calendering process after all the coating layers on the magnetic recording layer side have been formed.

That is, in the method for producing a magnetic recording medium according to the present invention, in order to produce a required multilayer medium, a monolayer coating and two-layer simultaneous multilayer coating are preferably used in combination for satisfying the desired coating thickness of each layer. Thus, a magnetic recording medium capable of preventing the turbulence in the interface between each layer and ensuring the surface properties of the uppermost layer can be obtained.

For example, when a magnetic recording medium having an upper magnetic layer, an intermediate magnetic layer and a lower nonmagnetic layer is produced, it is preferred that a lower nonmagnetic layer is coated on a support in the first stage, then an upper magnetic layer and an intermediate magnetic layer are simultaneously multilayer-coated to form a three layer structure medium. Alternatively, in the first stage, an intermediate magnetic layer and a lower nonmagnetic layer are coated on a support by simultaneous multilayer coating, then an upper magnetic layer is coated by monolayer coating.

The technique disclosed in JP-A-5-104054 can be preferably used in two-layer simultaneous multilayer coating.

Further, the technique disclosed in JP-A-7-287843 can be preferably used in thin layer monolayer coating.

For improving the surface properties of the uppermost layer which are most important in electromagnetic characteristics, it is effective to perform calendering process after all the layers have been coated.

That is, it has been found that when calendering process is performed after one or a plurality of lower layers have been formed and then, an upper layer is coated thereon, the surface properties of the uppermost layer are not improved even if calendering process is performed after that.

Three layers in the present invention do not include a thin undercoating layer for the improvement of the adhesion of the magnetic layer, or a thin overcoating lubricating layer for imparting running property and durability to the magnetic recording medium.

DETAILED DESCRIPTION OF THE INVENTION

Detailed description of the present invention will be described with referring to preferred examples.

Figure 1:
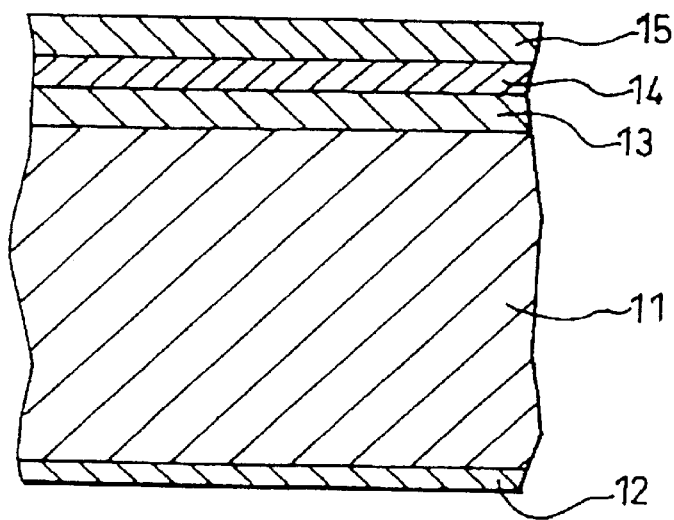
FIG. 1 is a drawing showing the constitution of a magnetic recording medium applicable to the present invention.

The constitution of a magnetic recording medium applicable to the present invention is shown in FIG. 1. In FIG. 1, reference numeral 11 designates a support; 12, a back coating layer; 13, a lower nonmagnetic layer; 14, an intermediate magnetic layer; and 15, an upper magnetic layer.

The prescriptions of the coating solution for the upper magnetic layer, coating solution for the intermediate magnetic layer, and the coating solution for lower nonmagnetic layer used in the examples are as follows.

| Prescription of Upper Magnetic Layer | |
|---|---|
| Ferromagnetic metal fine powder<br>Composition: Fe/Zn/Ni = 92/4/4<br>Hc: 2,300 Oe<br>Specific surface area ($S_{BET}$): 60 m$^2$2/g<br>Crystallize size: 18 nm<br>Average long axis length: 0.08 μm<br>Acicular ratio: 6<br>Saturation magnetization ($\sigma_s$): 130 emu/g | 100 parts |
| Vinyl chloride copolymer<br>—SO$_3$Na group content: 1 × 10$^{-4}$ eq/g<br>Polymerization degree: 300 | 12 parts |
| Polyester polyurethane resin<br>Neopentyl glycol/caprolactone polyol/MDI =<br>0.9/2.6/1<br>—SO$_3$Na group content: 1 × 10$^{-4}$ eq/g | 3 parts |
| α-Alumina<br>Average particle size: 0.1 μm | 2 parts |
| Carbon black<br>Average particle size: 0.08 μm | 0.5 parts |
| Butyl stearate | 1 part |
| Stearic acid | 2 parts |
| Methyl ethyl ketone | 200 parts |
| Prescription of Intermediate Magnetic Layer | |
| Ferromagnetic metal fine powder<br>Composition: Fe/Zn/Ni = 92/4/4<br>Hc: 1,600 Oe<br>Specific surface area ($S_{BET}$): 50 m$^2$/g<br>Crystallize size: 19.5 nm<br>Average long axis length: 0.20 μm<br>Acicular ratio: 10<br>Saturation magnetization ($\sigma_s$): 120 emu/g | 100 parts |
| Vinyl chloride copolymer<br>—SO$_3$Na group content: 1 × 10$^{-4}$ eq/g<br>Polymerization degree: 300 | 12 parts |
| Polyester polyurethane resin<br>Neopentyl glycol/caprolactone polyol/MDI =<br>0.9/2.6/1<br>—SO$_3$Na group content: 1 × 10$^{-4}$ eq/g | 3 parts |
| α-Alumina<br>Average particle size: 0.1 μm | 2 parts |
| Carbon black<br>Average particl size: 0.08 μm | 0.5 part |
| Butyl stearate | 1 part |
| Stearic acid | 2 parts |
| Methyl ethyl ketone | 200 parts |
| Prescription of Lower Nonmagnetic Layer | |
| Nonmagnetic powder, TiO$_2$<br>Average particle size: 0.035 μm<br>Crystal system: rutile<br>TiO$_2$ content: 90% or more<br>Specific surtace area ($S_{BET}$): 40 m$^2$/g<br>DBP oil absorption: 27 to 38 g/100 g<br>pH: 7.0 | 80 parts |
| Carbon black<br>Average particle size: 16 μm<br>DBP oil absorption: 80 ml/100 g<br>pH: 8.0<br>Specific surface area ($S_{BET}$): 250 m$^2$/g<br>Volatile content: 1.5% | 20 parts |
| Vinyl chloride/vinyl acetate/vinyl alcohol copolymer<br>Content of polar group of —N$^+$(CH$_3$)$_3$Cl$^-$: 5 × 10$^{-6}$ eq/g<br>Composition ratio: 86/13/1<br>Polymerization degree: 400 | 12 parts |
| Polyester polyurethane resin<br>Neopentyl glycol/caprolactone polyol/MDI =<br>0.9/2.6/1<br>—SO$_3$Na group content: 1 × 10$^{-4}$ eq/g | 5 parts |
| Butyl stearate | 1 part |
| Stearic acid | 1 part |
| Methyl ethyl ketone/cyclohexanone | 200 parts |

Each of the above compositions of the coating solutions for the magnetic layer and the nonmagnetic layer were blended in a kneader, then dispersed with a sand mill. Polyisocyanate was added to each resulting dispersion solution 3 parts. Further, 40 parts of butyl acetate was added to each solution. Each solution was filtered through a filter having an average pore diameter of 1 μm or less to obtain a coating solution for forming the magnetic layer.

The above-obtained coating solution for a magnetic layer was coated on a polyethylene terephthalate support having a thickness of 7 μm and central average surface roughness of 0.002 μm so that the thickness of the upper magnetic layer becomes 0.08 μm, the intermediate magnetic layer becomes 0.10 μm and the lower nonmagnetic layer becomes 1.0 μm.

The coated layer was oriented with a cobalt magnet having a magnetic force of 3,000G and a solenoid having a magnetic force of 1,500G while the coated layers were still wet. After drying, the coated layers were subjected to calendering process with 7-stage calender device constituted by only metal rolls at 90° C. The obtained web was slit to a width of 8 mm. Thus, samples of an 8 mm video tape were produced.

Magnetic recording media were produced by the following five conditions using each of the above coating solutions and with the same dry thickness.

EXAMPLE 1

Simultaneous multilayer coating of the intermediate layer and the lower layer→coating of the upper layer→calendering process.

That is, the intermediate layer and the lower layer were simultaneously multilayer-coated by the multilayer coating unit shown below, dried, then the upper layer was coated by a monolayer coating unit, dried, and then subjected to 7-stage calendering process.

Figure 2:
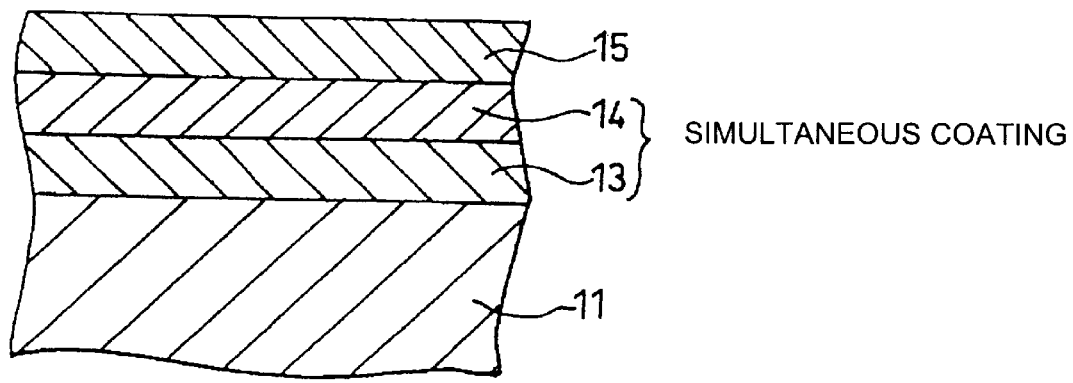
FIG. 2 is a cross sectional view of the magnetic recording medium formed by the coating method used in this example.

FIG. 2 is a cross sectional view of the magnetic recording medium formed by the coating method used in this example. In FIG. 2, intermediate magnetic layer 14 and the lower nonmagnetic layer 9 13 are the part formed by simultaneous multilayer coating and the upper magnetic layer 15 is the upper magnetic layer formed afterward.

EXAMPLE 2

Coating lower layer→simultaneous multilayer coating of intermediate layer and the upper layer→calendering process.

That is, the lower layer is coated by a monolayer coating unit, dried, then the intermediate layer and the upper layer were simultaneously multi-layer coated by the multilayer coating unit shown below, dried, and then subjected to 7-stage calendering process.

COMPARATTVE EXAMPLE 1

Simultaneous multilayer coating of the intermediate layer and the lower layer→calendering process→coating of the upper layer→calendering process.

That is, the intermediate layer and the lower layer were simultaneously multilayer-coated by the multilayer coating unit shown below, dried, then subjected to seven stage calendering process. Subsequently, the upper layer was coated by a monolayer coating unit, dried, and then again subjected to 7-stage calendering process.

COMPARATIVE EXAMPLE 2

Simultaneous multilayer coating of three layers of the upper layer, the intermediate layer and the lower layer→calendering process That is, the upper layer, the intermediate layer and the lower layer were coated by the three-layer simultaneous coating unit shown below, dried, and then subjected to 7-stage calendering process.

COMPARATIVE EXAMPLE 3

Coating the lower layer→calendering process→simultaneous multilayer coating of the intermediate layer and the upper layer→calendering process That is, the lower layer is coated by a monolayer coating unit, dried, then subjected to 7-stage calendering process, then the intermediate layer and the upper layer were simultaneously multi-layer coated by the multilayer coating unit shown below, dried, and then subjected to 7-stage calendering process.

The multilayer extrusion coating unit disclosed in JP-A-5-104054 were used in simultaneous multilayer coating of the intermediate layer and the lower layer in Example 1 and Comparative Example 1.

As the monolayer coating unit which was used in combination with the above multilayer coating unit, the extrusion coating unit equipped with a doctor blade disclosed in JP-A-7-287843 was used.

Further, as the three-layer simultaneous coating unit used in three-layer simultaneous coating of the upper layer, intermediate layer and the lower layer, the extrusion coating unit suitable for coating of three layers or more disclosed in JP-A-5-212337 was used.

The surface roughness Ra of the obtained magnetic recording medium after coating and drying, the surface roughness after calendering Rt, thickness variation at the interface between the upper layer and the intermediate layer, and 5 electromagnetic characteristics (7 MHz output and C/N ratio) were measured. The results obtained are shown in Table 1 below.

TABLE 1

| Production Method | Ra after Coating (nm) | Ra after Calendering (nm) | Thickness Variation at Interface between Upper Layer and Lower Layer ($\mu$m) | 7 MHz Output (dB) | C/N Ratio (dB) | E-valuation |
|---|---|---|---|---|---|---|
| Example 1 | 5.4 | 2.1 | 0.007 | 0.0 | 0.0 | ○ |
| Example 2 | 5.3 | 2.0 | 0.011 | 0.1 | 0.2 | ○ |
| Comparative Example 1 | 4.3 | 4.1 | 0.007 | −2.1 | −2.3 | x |
| Comparative Example 2 | 5.6 | 2.1 | 0.030 | −0.5 | −2.8 | x |
| Comparative Example 3 | 4.4 | 3.9 | 0.011 | −2.3 | −2.1 | x |

*Values of 7 MHz output and C/N ratio are relative values where those of Example 1 is 0.

Characteristics in Table 1 were measured as follows.
(Surface roughness)
Surface roughness was measured by 3d-MIRAU method. Surface roughness Ra of the area of about 250×250 $\mu$m$^2$ was measured with TOPO3D (a product of WYKO) by MIRAU method. The wavelength of measurement was 650 nm and spherical compensation and cylindrical compensation were applied. This system is a light interference type non-contact surface roughness meter.
(Thickness variation at interface)
A super thin sliced piece of the magnetic layer was observed. A sample having a thickness of about 0.1 $\mu$m was cut out with a diamond cutter, observed with a transmission type electron microscope and photographed. The interface of the upper layer and the lower layer and the magnetic layer surface were framed and the thickness of the magnetic layer was measured by the image processing apparatus IBASII and the variation of the thickness of the magnetic layer was obtained as Δd.
(7 MHz Output)
7 MHz signals were recorded using an 8 mm video deck, FUJIX 8 manufactured by Fuji Photo Film Co., Ltd. These signals were reproduced and 7 MHz signal reproduction output was measured using an oscilloscope.
(C/N Ratio)
7 MHz signals were recorded using an 8 mm video deck, FUJIX 8 manufactured by Fuji Photo Film Co., Ltd. These signals were reproduced and noises generated at 6 MHz was measured by spectral analyzer. The ratio of the reproduced signals to the noise was measured.

From the results in Table 1, the effect of the present invention is apparent.

The surface properties of the uppermost layer which are most important in electromagnetic characteristics are excellent by conducting calendering process after all the layers were coated as in Examples 1 and 2. Further, thickness variation at interface between the upper layer and the lower layer is small. On the other hand, as in Comparative Example 1, when the intermediate layer and the lower layer were simultaneously multilayer-coated, calendering-treated, further the upper layer was coated and subjected to calendering, although the obtained sample showed small thickness variation, the surface properties of the upper layer were deteriorated. When three layers were simultaneously multilayer-coated and subjected to calendering as in Comparative Example 2, thickness variation at interface was large.

That is, when calendering was performed after one or more lower layers were formed and further the upper layer was coated thereon, although the surface properties after coating were good compared with those not subjected to calendering, the surface properties were not further improved by calendering after that. As a result, the surface properties of the upper layer were deteriorated.

When a magnetic recording medium having an upper magnetic layer, an intermediate magnetic layer and a lower nonmagnetic layer is produced, it is preferred that a lower nonmagnetic layer is coated on a support in the first stage, then an upper magnetic layer and an intermediate magnetic layer are simultaneously multilayer coated to form a three layer structure medium. Alternatively, in the first stage, the intermediate magnetic layer and the lower nonmagnetic layer are coated on a support by simultaneous multilayer coating, then an upper magnetic layer is coated by monolayer coating. When three layers are coated simultaneously, thickness variation at interface between the upper layer and the intermediate layer is difficult to suppress. This thickness variation largely deteriorates the electromagnetic characteristics.

Moreover, the above described Example 1 is only an example and the present invention is not limited thereto. It is effective to coat the upper layer and the intermediate layer simultaneously, as well as performing simultaneous multi-layer coating of the intermediate layer and the lower layer. Simultaneous multilayer coating can effectively use various methods other than the methods using the above described coating units.

As explained in detail above, according to the present invention, a magnetic recording medium capable of suppressing the turbulence in the interface between each layer and ensuring the surface properties of the uppermost layer can be obtained by forming all the coating layers on the magnetic layer side at least two times dividedly.

What is claimed is:

1. A method for producing a multilayer magnetic recording medium comprising a support, a lower nonmagnetic layer, an intermediate magnetic layer and an upper magnetic layer, comprising the steps of:

forming the lower nonmagnetic layer on the support; and simultaneously forming the intermediate magnetic layer and the upper magnetic layer on the lower nonmagnetic layer.

2. The method according to claim 1, further comprising the steps of calendering the magnetic recording medium after forming the lower nonmagnetic layer, intermediate magnetic layer and upper magnetic layer.

3. A method for producing a multilayer magnetic recording medium comprising a support, a lower nonmagnetic layer, an intermediate magnetic layer and an upper magnetic layer, comprising the steps of:

simultaneously forming the lower nonmagnetic layer and the intermediate magnetic layer; and forming the upper magnetic layer on the intermediate magnetic layer.

4. The method according to claim 3, further comprising the step of calendering the magnetic recording medium after forming the lower nonmagnetic layer, intermediate magnetic layer and upper magnetic layer.

* * * * *